(12) United States Patent
Greenberg

(10) Patent No.: US 12,536,051 B2
(45) Date of Patent: Jan. 27, 2026

(54) LIFECYCLE AUTOMATION OF WORKFLOW PROCESSES SYSTEM FOR SOFTWARE DEVELOPMENT

(71) Applicant: Resilient Scale Inc, Buena Vista, CO (US)

(72) Inventor: Stephen Peter Greenberg, Buena Vista, CO (US)

(73) Assignee: Resilient Scale Inc., Nathrop, CO (US)

( * ) Notice: Subject to any disclaimer, the term of this patent is extended or adjusted under 35 U.S.C. 154(b) by 415 days.

(21) Appl. No.: 18/208,479

(22) Filed: Jun. 12, 2023

(65) Prior Publication Data

US 2023/0401101 A1 Dec. 14, 2023

Related U.S. Application Data

(60) Provisional application No. 63/351,509, filed on Jun. 13, 2022.

(51) Int. Cl.
*G06F 9/50* (2006.01)
(52) U.S. Cl.
CPC .................................. *G06F 9/505* (2013.01)
(58) Field of Classification Search
None
See application file for complete search history.

(56) References Cited

U.S. PATENT DOCUMENTS

| | | | |
|---|---|---|---|
| 10,929,907 B1 * | 2/2021 | Myers, Jr. | ............ H04L 41/0886 |
| 11,216,265 B1 | 1/2022 | Hornbeck | |
| 2013/0227573 A1 | 8/2013 | Morsi et al. | |
| 2017/0315714 A1 | 11/2017 | Shyamsundar et al. | |
| 2020/0133711 A1 | 4/2020 | Webster et al. | |
| 2023/0415348 A1 * | 12/2023 | Afrooze | ................... B25J 9/161 |

\* cited by examiner

*Primary Examiner* — Adam Lee
(74) *Attorney, Agent, or Firm* — MUNCY, GEISSLER, OLDS & LOWE, P.C.

(57) ABSTRACT

A system and method for lifecycle automation of workflow processes. The system includes a memory and one or more processors to execute computer-readable instructions stored in the memory to perform a method. The method has the following steps. First, authorizing access via a dashboard or API to a centralized library repository. The centralized library repository hosts shared automation configuration. The shared automation configuration is configured to be selected via a blueprint profile or by the user team and applied to a managed repository. Second, generating a configuration file. The configuration file defines the shared automation configuration parameters for the managed repository. Lastly, committing the configuration file to the managed repository thereby committing the shared automation configuration to the managed repository. The system is configured to track inputs to the shared automation configuration and propagate changes that result from the input to impacted managed repositories.

18 Claims, 8 Drawing Sheets

LIFECYCLE AUTOMATION OF WORKFLOW PROCESSES SYSTEM FOR SOFTWARE DEVELOPMENT

The subject matter of this application is related to U.S. Provisional application No. 63/351,509, filed on Jun. 13, 2022, which is hereby incorporated by reference in its entirety.

BACKGROUND

The present invention generally relates to a lifecycle automation of workflow processes for software development. More specifically, the present invention relates to a system and method for applying automation configuration parameters to one or more managed repositories to be executed by an automation platform.

Technology organizations increasingly embrace automation of a software development lifecycle to improve productivity, safety and speed of delivery of high-quality software and optimize workflow processes. The Development Operations (DevOps) and continuous integration/continuous delivery (CI/CD) practices have proven to be valuable tools for delivering business value faster and with greater confidence in a software development space.

Successful CI/CD requires automating the entire lifecycle of an application or software-defined infrastructure. At a minimum, this includes automatically integrating changes, building, testing, and deployment. Creating and maintaining a standard level of automation across the organization is a significant undertaking for any one team. In the technical organizations with many teams, the effort spent on CI/CD and other DevOps practices can be overwhelming.

A solution is therefore needed that enables an organization to define comprehensive automation configuration parameters that can be applied to one or more repositories thereby allowing the organization to create, share, reuse, and update standardized automation across the organization.

SUMMARY

According to a non-limiting embodiment of the present invention, a system and method for lifecycle automation of workflow processes are provided. The system includes a memory and one or more processor to execute computer-readable instructions stored in the memory to perform a method. The method can have the following steps. First, authorizing access via a dashboard or an application programming interface (API) to a centralized library repository hosted on an automation platform. The centralized library repository hosts shared automation configuration. The shared automation configuration is configured to be selected and applied to a managed repository. Second, generating a configuration file. The configuration file defines the shared automation configuration for the managed repository. Lastly, committing the configuration file to a root of the managed repository thereby resulting in a comprehensive automation for the repository, derived from the shared automation configuration. The system is configured to track inputs to the shared automation configuration and propagate changes that result from the input to impacted managed repositories.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
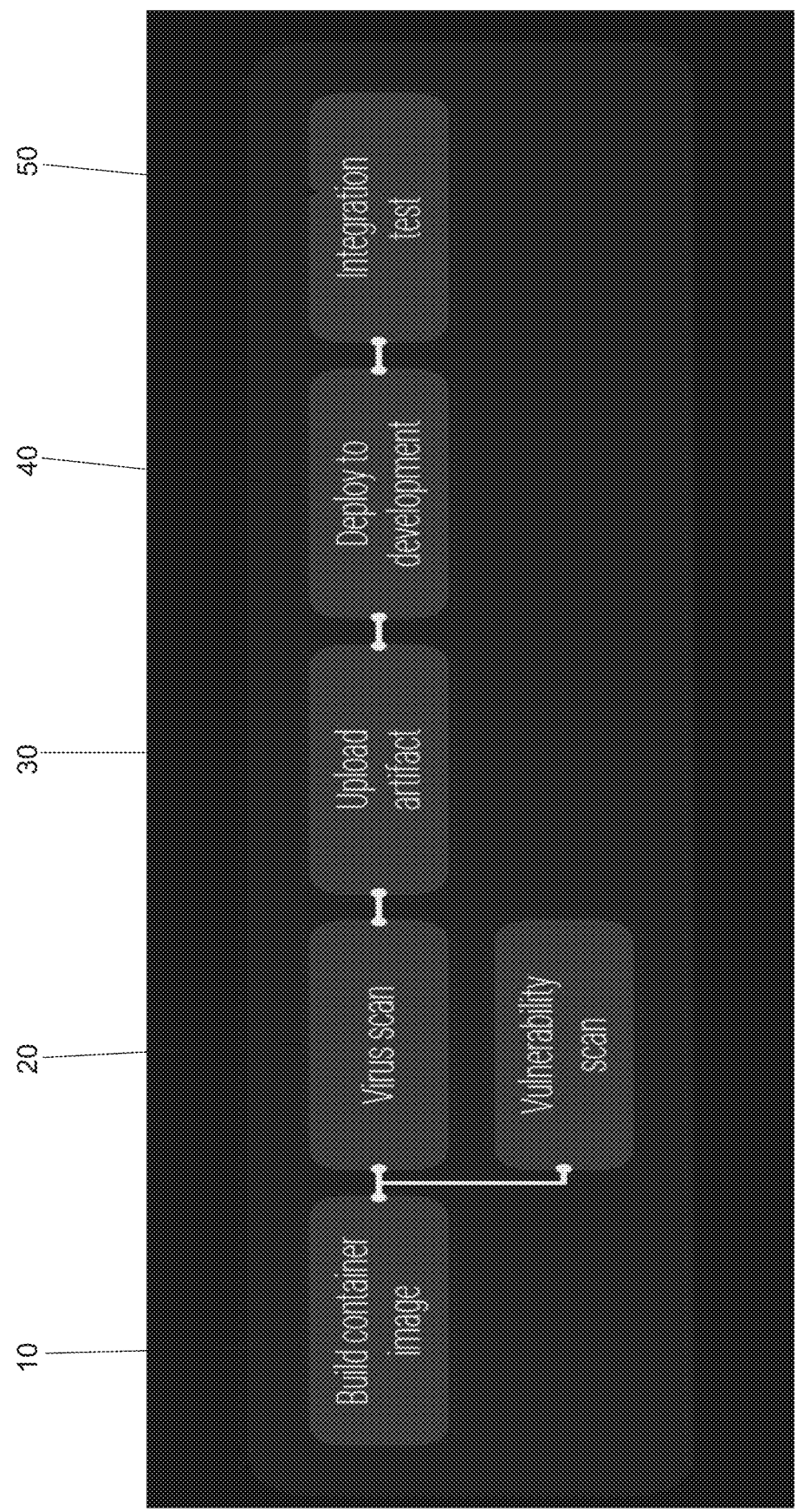
FIG. 1 depicts a diagram of an exemplary application development environment workflow in accordance with embodiments of this invention.

In the accompanying figures and following detailed description of the described embodiments, the various elements illustrated in the figures are provided with two, three or four digit reference numbers. With minor exceptions, the leftmost digit(s) of each reference number correspond to the figure in which its element is first illustrated.

DETAILED DESCRIPTION

Reference to "a specific embodiment" or a similar expression in the specification means that specific features, structures, or characteristics described in the specific embodiments are included in at least one specific embodiment of the present invention. Hence, the wording "in a specific embodiment" or a similar expression in this specification does not necessarily refer to the same specific embodiment.

Hereinafter, various embodiments of the present invention will be described in more detail with reference to the accompanying drawings. Nevertheless, it should be understood that the present invention could be modified by those skilled in the art in accordance with the following description to achieve the excellent results of the present invention. Therefore, the following description shall be considered as a pervasive and explanatory description related to the present invention for those skilled in the art, not intended to limit the claims of the present invention.

Reference to "an embodiment," "a certain embodiment" or a similar expression in the specification means that related features, structures, or characteristics described in the embodiment are included in at least one embodiment of the present invention. Hence, the wording "in an embodiment," "in a certain embodiment" or a similar expression in this specification does not necessarily refer to the same specific embodiment.

For illustrative purposes only and not to limit the present disclosure, the following terms are used to describe the present invention.

GENERAL DEFINITIONS

Automation: The execution by a computer system of activities related to continuous integration/continuous delivery (CI/CD) practices, development, deployment, maintenance, security, compliance of software code or infrastructure. For example, automation of a software code for a specific computer program could be triggered by committing to a repository of edits to the code and consisting of activities including scanning the program's software code for known computer viruses, followed by compiling the code into an executable version of the program followed by copying the executable to computer servers, followed by instructing the servers to run the program.

Automation Platform: A computer platform implementing the automation, for example, GitHub Actions, GitLab CI/CD, Jenkins, and Concourse.

Automation Team: A central team in an organization that builds, manages, and maintains automation to meet organizational requirements with input from other organizational teams including developers, infrastructure, security, and compliance. Generally, such teams are referred to as platform engineering team, DevOps team, DevSecOps team, or site reliability engineering team.

User Team: A team in an organization that builds, manages, and maintains application or infrastructure software to be deployed by the organization. Generally, such teams are referred to as software development team, application development team, or Dev team. A user team generally uses source code management and applies automation requirements to the application or infrastructure software it is building, managing, and maintaining.

Configuration Parameter: Data to be used as input parameters to instruct a computer system to execute. For example, a configuration parameter can be a secret used to access a computer server over the Internet or a DNS name used to access an application in a browser.

Event: A communication of a signal, by a user or a computer system, relating to a repository of a software code. For example, an event can signify that edits to the code are committed to a code repository by a user team.

Job: An automated process included in a workflow. For example, a "build container image" job. A job is made up of one or more steps (below).

Repository: A central location for storing software code and/or configuration.

Source Code Management: A computer platform used to manage source code and configuration.

Step: A smallest unit of an automation. For example, the "build container image" job may consist of the following steps: checkout the code from a repository, build the container image using Docker platform (docker.com), and set the name and version number of the built image.

Workflow: An automation process triggered by an event. For example, a continuous integration workflow can be triggered upon code changes or via user clicking a button. The workflow can run unit tests, build a container image for a software program, run virus and vulnerability scans, deploy the containerized program to development infrastructure, run and report on an integration test suite validating the functionality of the program. A workflow has one or more jobs.

System Definitions

Blueprint: A blueprint defines the entirety of automation to be applied to a specific software application or infrastructure code repository. Automation is defined in workflow templates (below).

Blueprint Profile: A blueprint profile allows the automation team to define rules around blueprint selection and application based on labels on a managed repository (below).

Job Definition: A reusable automation block that can be configured in a workflow template (defined in below). For example, a workflow template may require a user to provide a job definition for integration tests.

Library Repository: A source repository, controlled by the automation team, which contains shared automation, including blueprints, workflow templates, job definitions, and step definitions.

Managed Repository: A source repository (software or infrastructure) for which the system is managing automation using a blueprint.

Managed Repository Configuration: A single configuration file committed to the managed repository, directing the system how to apply a blueprint, for example, a YAML file (a human-readable format for data serialization).

Step Definition: A small, reusable automation block that can be configured in a workflow template or job. For example, a workflow template may allow the user to select a method of application containerization—either using a technology like Docker platform (docker.com) or Buildpacks platform (buildpacks.io). Each method can be implemented as a step definition.

Workflow Template: A composable and reusable automation used to generate a workflow. Workflow templates define a required configuration and configurable automation. Configurable automation is implemented in the form of job and step definitions.

A system and method according to embodiments of the present invention can be used for software delivery, software continuous integration (CI), software continuous delivery (CD), software continuous deployment and other automation processes employed in the field of software development and infrastructure management. The system and method allow technology organizations to efficiently, correctly and quickly create, share, reuse, and update standard automation across the organization.

As software development is becoming a more complex and time-consuming process, technology organizations increasingly rely on automation of a software development lifecycle to improve productivity, safety and speed of software delivery and optimize workflow processes.

A software development lifecycle of a software application can include various development-related activities and process, for example unit and integration tests, building a container image, adding version artifacts to trace when a specific version of the application was deployed, providing deployment traceability, zero downtime updates, rollback, virus and vulnerability scanning, penetration testing, compliance testing and reporting, and keeping the forging processes up to date. In any one organization, these activities must be performed by every single software development team within the organization. This means that without automation, each team must duplicate these activities to deliver software programs that meet all organizational requirements.

Figure 3:
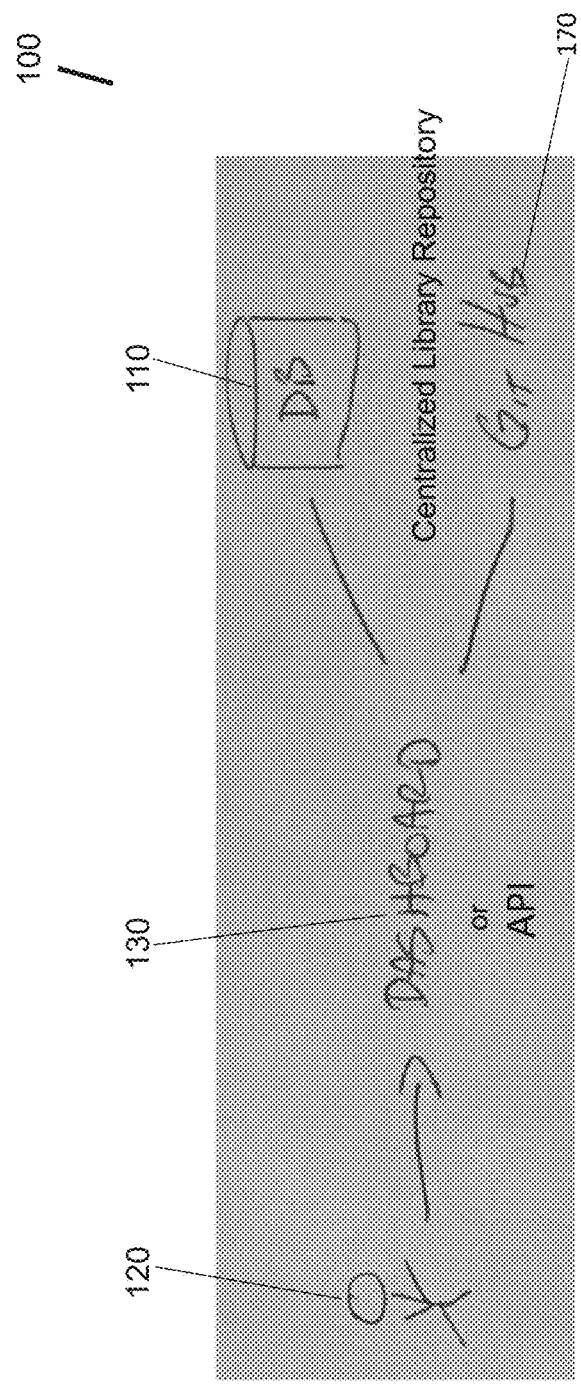
FIG. 3 depicts a diagram of a system in accordance with embodiments of this invention.

To improve the lifecycle automation processes and allow the organization to build, centrally maintain and update the shared automation that meets the requirements across organization, and allowing a user team (application development team) to focus on the application specific automation and parameters, a system 100 (as illustrated in FIG. 3) of the present invention enables the organization to define comprehensive automation (shared automation configuration) that can be applied to one or more repositories (managed repositories), to be executed by an automation platform.

While this disclosure uses the processes relating to a development lifecycle of a web applications to illustrate exemplary embodiments of the present invention, a person skilled in the art will readily understand that the concepts described in this disclosure can be applied to other forms of automation scenarios, such as Infrastructure as Code (IaC), Infrastructure as Software (IaS), Infrastructure as a Service (IaaS) and other software development automation.

Figure 2:
FIG. 2 depicts a diagram of an exemplary application development environment workflow by breaking the workflow into three buckets in accordance with embodiments of this invention.

FIGS. 1 and 2 illustrate an exemplary application development environment workflow to which the system and methods of the present invention can be applied. More specifically, as illustrated in FIG. 1, the exemplary application development environment workflow includes the following steps. When a user team commits the web application code to a git repository, for example GitHub, the automation generally (i) virtualizes the application by containerization, as shown in a step 10; (ii) runs various scans as shown in a step 20, such as virus and vulnerability scans; (iii) uploads software artifacts, as shown in a step 30, such as data models or workflow diagrams; (iv) deploys the application into a development environment, as shown in a step 40; and (v) runs a test suite, as shown in a step 50.

FIG. 2 further illustrates the development environment workflow by breaking the workflow processes into three buckets to describe the processes that, for example, should be consistent across the organization but are specific to a technology stack or the application. The first bucket 15 (shown in FIG. 2) illustrates the processes and constructs that must be the same across the organization. For example, versioning semantics and artifact naming should be the same across the organization. According to embodiment of the present invention, the system 100 can apply automation (shown in FIG. 4) specific to the organization to the processes identified in the first bucket 15.

As shown in FIG. 2, the second bucket 25 illustrates the processes and constructs that must be the same across the organization when these processes and construct relate to the same technology or infrastructure. The unit testing process depends on the programming language and therefore is technology-specific. Yet, for a given language, executing unit tests is the same across the organization. Building the container image can be performed, for example, by Docker (docker.com) or using buildpacks (buildpacks.io). Yet containerization using Docker should be the same across the organization. According to embodiment of the present invention, the system 100 can apply automation specific to the technology stack to the processes identified in the second bucket 25.

The last bucket 35 shown in FIG. 2 is specific to the application (or managed repository), which the user team, for example, is readying for a deployment, and can include integration testing to evaluate the compliance of the application with the specific functional requirements and other application specific jobs. According to embodiment of the present invention, the system 100 can apply automation specific to the application to the processes identified in the third bucket 35.

According to embodiments of the present invention, the system 100 can be implemented on GitHub Actions platform and integrated as a GitHub application. However, a person skilled in the art readily understands that system 100 can be used on any platform that can be shared with software developers to automate software programs and infrastructure. The organizations can utilize various automation platforms and software repository services. For example, in addition to GitHub, the automation tools include but are not limited to GitLab CI/CD, Jenkins, and Concourse.

According to embodiments of the present invention, as illustrated in FIG. 3, the system 100 can have a dashboard 130. The dashboard 130 can be configured to allow a user 120 (e.g., a user team) to access a centralized library repository 150 (shown in FIG. 6) hosted on an automation platform 170, for example, GitHub Actions Platform. The centralized library repository 150 is controlled by the automation team and houses shared automation configuration (SAC), including blueprints, blueprint profiles, workflow templates, job definitions, and step definitions.

Figure 4:
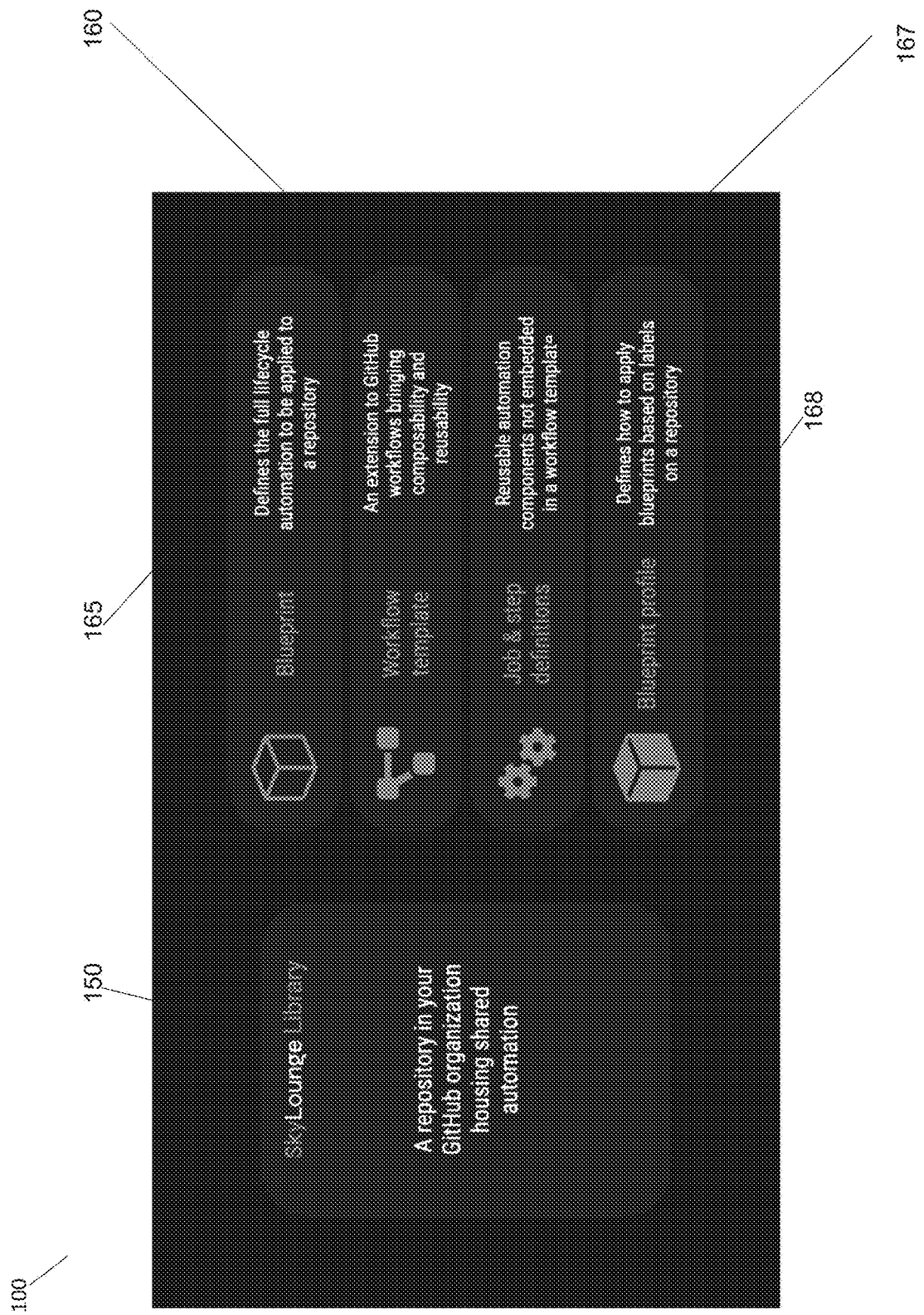
FIG. 4 depicts a diagram of an embodiment of the system in accordance with embodiments of this invention.

As illustrated in FIG. 4, according to embodiments of the present invention, a blueprint defines the entirety of automation to be applied to a specific software or infrastructure code repository (a managed repository). For example, a blueprint for web applications can define automation for continuous integration, continuous delivery, configuration management, security scans and reporting (virus scanning, vulnerability scanning, penetration testing, and the like), compliance checks and reporting, and code quality for all web applications in the organization. The organization can have multiple blueprints that are stored in the centralized library repository 150.

Workflow templates 160 are composable and reusable automation definitions used to generate a workflow. Workflow templates define a required configuration and configurable automation to be defined by the user team. For example, as shown in FIG. 2, the workflow templates can include automation configuration for versioning, virus scanning, and other templates that are the same across the organization. The workflow template can also include one or more configuration parameters to be available as inputs to instructions or job and step definitions 167.

Job and step definitions 167 are configurable and reusable automation blocks not embedded in a workflow template. For example, a workflow template for a web application may require the user to provide a reference to the integration tests for the web application. Job and step definition can be any definitions that are stack technology dependent and are determined by the user team rather than automation team, for example a DevOps team or a DevSecOps team.

Blueprint profiles 168 define rules attributed to blueprint selection and application based on labels defined in the managed repository 270. This allows large organizations to speed up an onboarding process on the automation platform 170.

Figure 5:
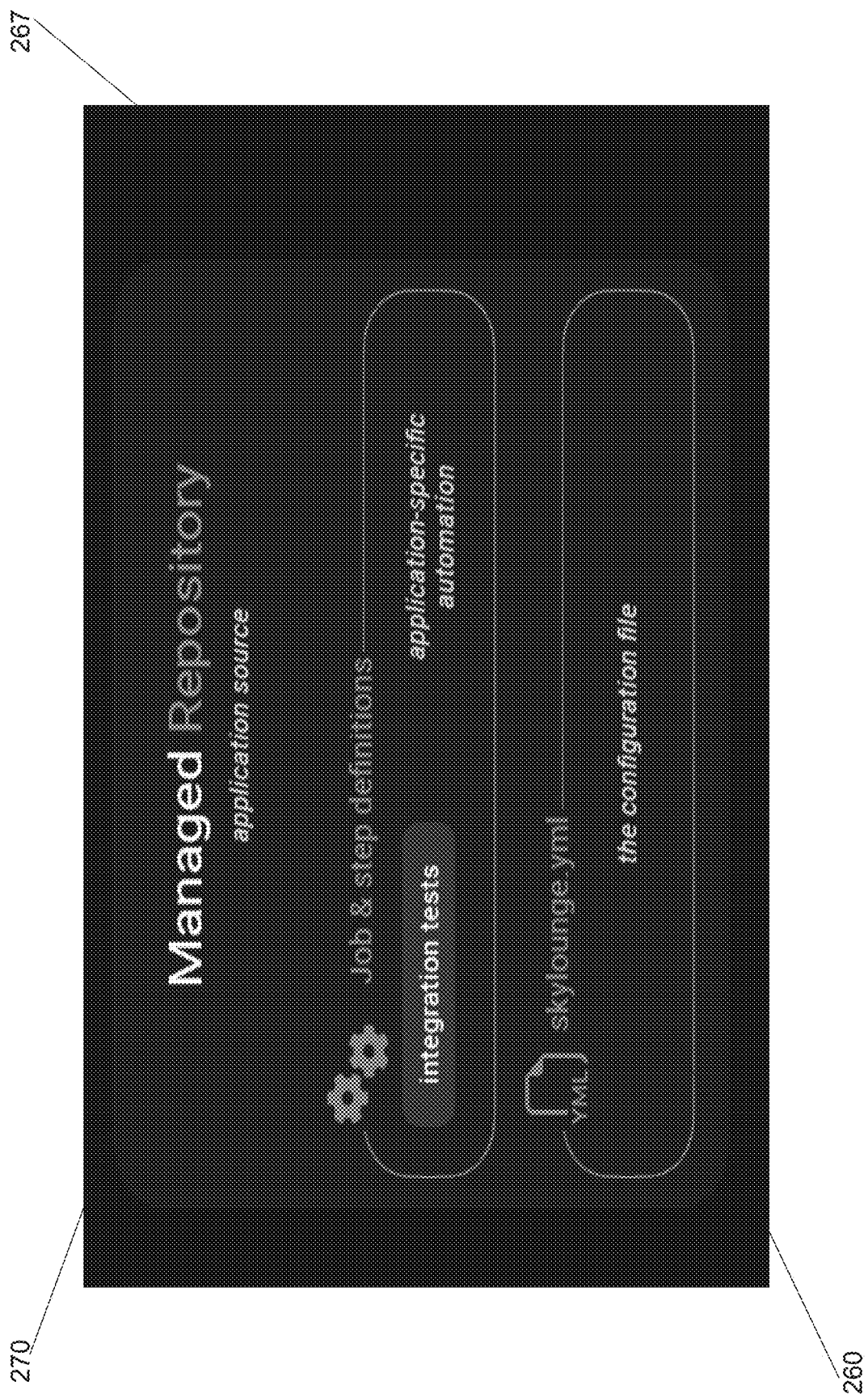
FIG. 5 depicts a diagram of yet another embodiment of the system in accordance with embodiments of this invention.

As illustrated in FIG. 5, the user team implements SAC by applying a single configuration file 260 to a managed repository 270, i.e., a source repository for which the system 100 is managing automation using, for example, a blueprint. According to embodiments of the present invention, the configuration file 260 can be in YAML language, or in any other suitable language for configurations files.

In addition, as shown in FIG. 3, the system database 110 stores metadata generated based on user data, managed and library repositories, library repositories' reference files and other related system 100 data.

The system 100 can be configured to perform methods for lifecycle automation of workflow processes. That is, the system 100 allows the user team to solely focus on developing and delivering, for example, a web application, while the system 100 applies SAC to the workflow processes.

Figure 6:
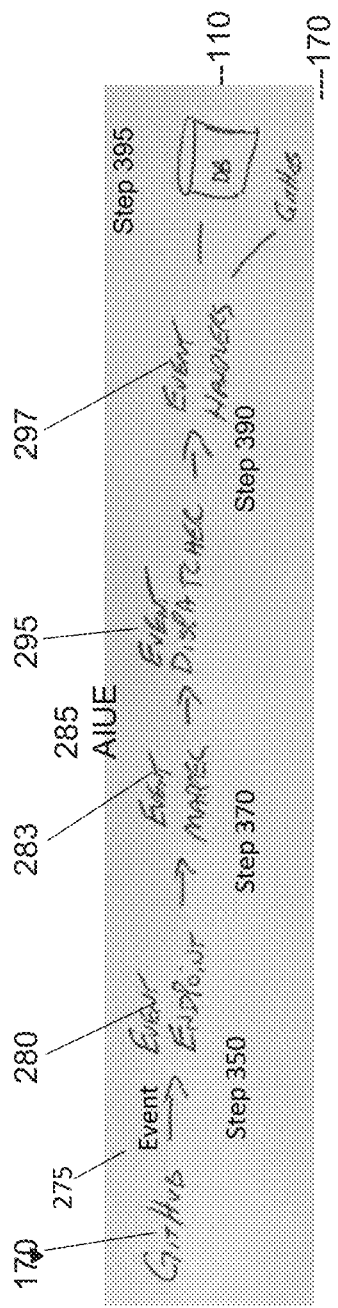
FIG. 6 depicts a diagram of an event flow of a method for lifecycle automation of workflow processes in accordance with embodiments of this invention.

In particular, FIG. 6, illustrates the system 100 event flow executed by the automation platform 170, for example, GitHub. In a step 350, an event 275 is generated by the source management platform (not shown) and enters the system 100 via endpoint 280, for example, a GitHub webhook. The event can be a new or revised software source code that is committed to the managed repository 270 that triggers one or more workflow processes. Some events have multiple activity types.

In a step 370, an event mapper 283 converts the event 275 (i.e., the event generated by the automation platform 170) into an automation input updated event 285. The automation input updated event 285 can be specific to the managed repository 270. The automation input updated event can be a software source code commit that triggers a workflow process. In a step 390, an event dispatcher 295 selects an event handler 297 for the automation input updated event 285. In a step 395, the event handler 297 process the automation input updated event 285 by applying configuration parameters derived from the database 110 and the automation platform 170.

Figure 7:
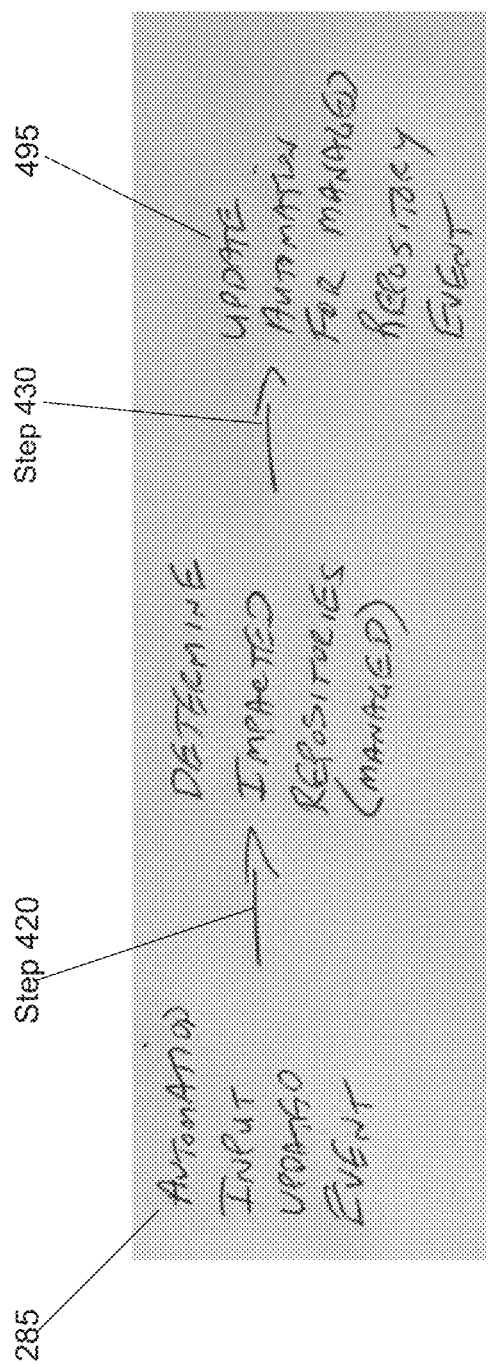
FIG. 7 depicts a diagram of an exemplary embodiment of the event flow for lifecycle automation of workflow processes in accordance with embodiments of this invention.

As shown in FIG. 7, in a step 420 after the automation input updated event 285 is received, the event handler 297 determines which managed repository or repositories 270 are impacted or should be impacted by the event. In a step 430 a managed repository automation input updated event 495 for each managed repository is generated.

Figure 8:
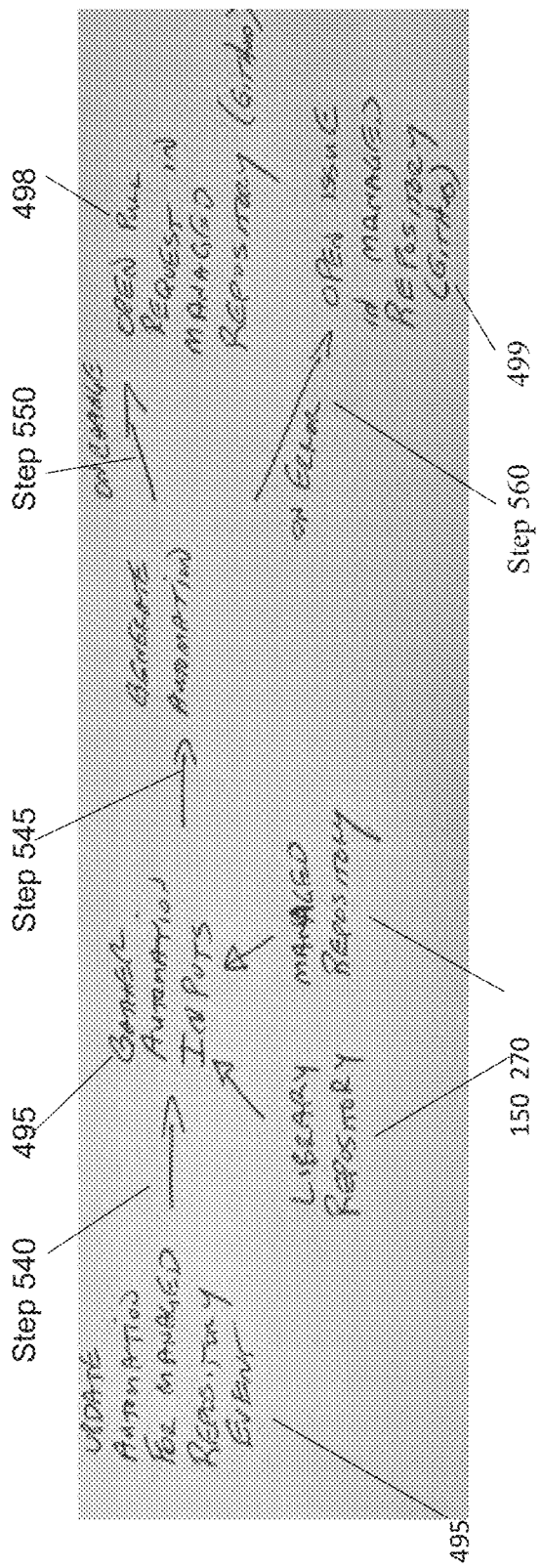
FIG. 8 depicts a diagram of an exemplary embodiment of the event flow of a method for lifecycle automation of workflow processes in accordance with embodiments of this invention.

As further illustrated in FIG. 8, in a step 540, the managed repository automation input event 495 triggers collecting shared automation data (e.g., blueprint, workflow templates, job definitions, and step definitions) from the library repository 150 and software application or infrastructure data specific to the managed repository 270.

In a step 545, the managed repository automation input event 495 triggers generation of the automation based on the managed repository automation input updated event 495. That is, the repository specific automation is generated for the managed repository 270 by applying the configuration file 260.

As shown in a step 550, if the managed repository automation input updated event 495 results in a change to the managed repository 270, the system 100 opens a pull request 498 in the managed repository 270 (or commits directly to the managed repository depending on the configuration provided by the automation team). Once the pull request 498 is approved, the changes can be merged into the managed repository 270.

Alternatively, in a step 560, if the managed repository automation input event 495 results an error, the system 100 creates an issue 499 in the managed repository 270, documenting workaround solutions and/or how to fix the error if possible.

According to aspects of the present invention, the organization charged with a software development processes can have two distinct teams, the automation team and the user team. The automation team is a central team in the organization that builds, manages, and maintains automation to meet organizational requirements with input from other organizational teams including developers, infrastructure, security, and compliance. Organizations often call this team platform engineering, DevOps, DevSecOps, or site reliability engineering. The user team is the team that employs system 100 of the present invention to apply automation requirement to an application or infrastructure software to be deployed by the organization.

The system 100 enables the organization to define comprehensive automation (expressed in blueprints, workflow templates, job and step definitions) that can be applied to one or more managed repositories 270, to be executed by the automation platform 110 (e.g., GitHub Actions Platform).

More specifically, the automation team develops, manages, and maintains shared automation (blueprints, blueprint profiles, workflow templates, job and step definitions) in a centralized library repository 150 with input from other organizational teams including developers, infrastructure, security, and compliance.

The automation team identifies required configuration, automation choices (configurable steps and jobs), and repository specific automation that must be provided by the user team that manages a specific managed repository, for example, a web application or IaC. The user team controls access to the managed repository 270 through the source management system (not shown), or the automation platform 170.

The user team can provide managed repository specific configuration through managed repository configuration (configurable steps and jobs) committed in the repository via the configuration file 260, as illustrated in FIG. 5. According to embodiments of the present invention, the configuration file 260 is committed to the managed repository 270. The user team also can provide managed repository specific automation by configuring the automation in the managed repository configuration.

The system 100 tracks inputs to automation and propagates changes to impacted managed repositories via the source management system (e.g., pull requests or commits), as illustrated in FIG. 8. On the other hand, when an error occurs during automation processes, the error is reported through the source management system (e.g., issues in GitHub), as illustrated in FIG. 8.

The foregoing detailed description of the embodiments is used to further clearly describe the features and spirit of the present invention. The foregoing description for each embodiment is not intended to limit the scope of the present invention. All kinds of modifications made to the foregoing embodiments and equivalent arrangements should fall within the protected scope of the present invention. Hence, the scope of the present invention should be explained most widely according to the claims described thereafter in connection with the detailed description, and should cover all the possibly equivalent variations and equivalent arrangements.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form described. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
a memory; and
one or more processors to execute computer-readable instructions stored in the memory to execute a method comprising:
authorizing access via a dashboard or application programming interface (API) to a centralized library repository hosted on an automation platform, the centralized library repository comprising a shared automation configuration configured to be selected and applied to a managed repository of a plurality of managed repositories;
generating a configuration file, wherein the configuration file defines the shared automation configuration for the managed repository;
committing the configuration file to the managed repository thereby generating and committing repository-specific automation based on the shared automation configuration to the managed repository; and,
merging changes that result from inputs to the shared automation configuration into at least one of the plurality of managed repositories impacted by the inputs.

2. The system according to claim 1, wherein the dashboard is configured to access a database comprising metadata generated from user data, managed repository data, centralized library repository data, and reference files.

3. The system according to claim 1, wherein the shared automation configuration comprises blueprints, blueprint profiles, workflow templates, job definitions, and step definitions.

4. The system according to claim 3, wherein the blueprints comprise any repository related to automation activities selected from a group of continuous integration activities, continuous delivery activities, configuration management, security scans and reporting, compliance checks and reporting, and code quality.

5. The system according to claim 3, wherein the blueprint profiles comprise rules on blueprint selection and configuration based on labels on a managed repository.

6. The system according to claim 3, wherein the workflow templates comprise reusable automation used for generation of a workflow, and wherein the workflow is an automation process triggered by an event.

7. The system according to claim 3, wherein the job definitions comprise a plurality of automation activities.

8. The system according to claim 1, wherein the configuration file is a YAML file.

9. A method comprising:
authorizing access via a dashboard or application programming interface (API) to a centralized library repository hosted on an automation platform, the centralized library repository comprising a shared automation configuration configured to be selected and applied to a managed repository of a plurality of managed repositories;
generating a configuration file, wherein the configuration file defines the shared automation configuration for the managed repository;
committing the configuration file to the managed repository thereby generating and committing repository-specific automation based on the shared automation configuration to the managed repository; and
merging changes that result from inputs to the shared automation configuration into at least one of the plurality of managed repositories impacted by the inputs.

10. The method of claim 9, further comprising:
generating an automation input updated event from an automation system event;
applying the automation input updated event to at least one of the plurality of managed repositories; and
generating a managed repository automation input update event, wherein the managed repository automation input update event triggers gathering of the shared automation configuration parameters from the centralized library repository and the managed repository to generate the automation for the managed repository.

11. The method of claim 10, further comprising:
generating a pull request in the automation platform when a change to the managed repository is indicated; and
committing the change to the managed repository upon approval by a user team.

12. The method of claim 10, further comprising:
generating an issue in the automation platform when an error is detected.

13. The method of claim 10, wherein the configuration file is a YAML file.

14. The method of claim 9, wherein the shared automation configuration comprises blueprints, blueprint profiles, workflow templates, job definitions, and step definitions.

15. The method of claim 14, wherein the blueprints comprise any repository related automation activities selected from a group of continuous integration activities, continuous delivery activities, configuration management, security scans and reporting, compliance checks and reporting, and code quality.

16. The method of claim 14, wherein the blueprint profiles comprise rules on blueprint selection and configuration based on labels on a managed repository.

17. The method of claim 14, wherein the workflow templates comprise reusable automation used for generation of a workflow, and wherein the workflow is an automation process triggered by an event.

18. The method of claim 14, wherein the job definitions comprise a plurality of automation activities.

* * * * *